US007825919B2

(12) United States Patent

Woo et al.

(10) Patent No.: US 7,825,919 B2

(45) Date of Patent: Nov. 2, 2010

(54) SOURCE VOLTAGE REMOVAL DETECTION CIRCUIT AND DISPLAY DEVICE INCLUDING THE SAME

(75) Inventors: Jae-Hyuck Woo, Yongin (KR); Jae-Goo Lee, Yongin (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 928 days.

(21) Appl. No.: 11/120,194

(22) Filed: May 3, 2005

(65) Prior Publication Data

US 2005/0275613 A1 Dec. 15, 2005

(30) Foreign Application Priority Data

May 15, 2004 (KR) ...................... 10-2004-0034546

(51) Int. Cl.
*G06F 3/038* (2006.01)
*G09G 5/00* (2006.01)

(52) U.S. Cl. ...................................................... 345/211

(58) Field of Classification Search ................. 345/211, 345/212, 87–104

See application file for complete search history.

(56) References Cited

U.S. PATENT DOCUMENTS

| | | | | |
|---|---|---|---|---|
| 5,248,963 | A * | 9/1993 | Yasui et al. | 345/98 |
| 5,323,171 | A * | 6/1994 | Yokouchi et al. | 345/94 |
| 5,576,737 | A * | 11/1996 | Isozaki | 345/211 |
| 5,793,346 | A * | 8/1998 | Moon | 345/92 |
| 6,064,360 | A * | 5/2000 | Sakaedani et al. | 345/92 |
| 6,271,812 | B1 * | 8/2001 | Osada et al. | 345/76 |
| 6,310,497 | B1 * | 10/2001 | Strauss | 327/143 |
| 6,621,233 | B2 * | 9/2003 | Kawano | 315/169.3 |
| 6,731,258 | B2 * | 5/2004 | Lin et al. | 345/87 |
| 7,109,965 | B1 * | 9/2006 | Lee et al. | 345/98 |
| 7,408,541 | B2 * | 8/2008 | Fukutoku | 345/211 |
| 2002/0003525 | A1 * | 1/2002 | Hwang | 345/102 |
| 2002/0041279 | A1 * | 4/2002 | Chou | 345/211 |
| 2002/0080133 | A1 * | 6/2002 | Eu | 345/212 |
| 2002/0089482 | A1 * | 7/2002 | Hanzawa et al. | 345/92 |
| 2002/0126113 | A1 * | 9/2002 | Iwasaki | 345/211 |
| 2004/0104908 | A1 * | 6/2004 | Toyozawa et al. | 345/211 |
| 2004/0153680 | A1 * | 8/2004 | Miyake et al. | 713/340 |
| 2005/0253832 | A1 * | 11/2005 | Chung | 345/204 |
| 2007/0075750 | A1 * | 4/2007 | Woo et al. | 327/77 |

FOREIGN PATENT DOCUMENTS

| | | | |
|---|---|---|---|
| CN | 1420483 | A | 5/2003 |

* cited by examiner

*Primary Examiner*—Chanh Nguyen
*Assistant Examiner*—Robert M Stone
(74) *Attorney, Agent, or Firm*—Volentine & Whitt, P.L.L.C.

(57) ABSTRACT

A control signal for removal of an afterimage from an active matrix display device is generated after the removal or disconnect of power from the device. A detector circuit receives a first voltage from a first voltage source and a second voltage from a second voltage source, and outputs a detection signal when either one of the first and second voltages drops to a given voltage level. An output circuit which receives the detection signal and outputs the control signal for removal of the afterimage from the active matrix display device.

32 Claims, 8 Drawing Sheets

SOURCE VOLTAGE REMOVAL DETECTION CIRCUIT AND DISPLAY DEVICE INCLUDING THE SAME

BACKGROUND OF THE INVENTION

1. Field of the Invention

The present invention generally relates to active matrix panel display devices, and more particularly, the present invention relates to source voltage removal detection circuits, and to display devices which include source voltage removal detection circuits.

2. Description of the Related Art

In active matrix type liquid crystal display (LCD) panels, the problem of "after images" occurs when power to the panel is removed. That is, unlike passive matrix type devices which undergo compulsive electric discharge when powered down, it takes time for the electronic charges stored in capacitive cells of active matrix type devices to dissipate when power is removed. As a result, after images occur in which the displayed image only gradually fads from view after the power is removed.

The presence of after images in active matrix type LCD panels is aesthetically undesirable, and there is thus a demand in the LCD industry to remove after images appearing on LCD panels immediately upon removal of power to the panels.

SUMMARY OF THE INVENTION

According to an aspect of the present invention, a circuit for generating a control signal for removal of an afterimage from an active matrix display device is provided which includes a detector circuit which receives a first voltage from a first voltage source and a second voltage from a second voltage source, and which outputs a detection signal when either one of the first and second voltages drops to a given voltage level, and an output circuit which receives the detection signal and outputs the control signal for removal of the afterimage from the active matrix display device.

According to another aspect of the present invention, display device is provided which includes an active matrix display panel and a display driver operatively coupled to the display panel, where the display panel includes a matrix of display elements connected to source lines and gate lines, and where the display driver includes a control circuit for generating a control signal for removal of an afterimage from the active matrix display device. The control circuit includes a detector circuit receives a first voltage from a first voltage source and a second voltage from a second voltage source, and outputs a detection signal when either one of the first and second voltages drops to a given voltage level, and an output circuit which receives the detection signal and outputs the control signal for removal of the afterimage from the active matrix display device.

According to yet another aspect of the present invention, a method of removing an afterimage in an active matrix panel display device is provided which includes detecting when the voltage of at least one of a plurality of voltage sources has dropped to a given voltage, and in response, controlling the active matrix panel display device to accelerate the removal the afterimage from the display device.

According to still another aspect of the present invention, a method of removing an afterimage in an active matrix panel display device is provided. The display panel comprises a matrix of display elements connected to source lines, gate lines and a common voltage terminal, and wherein each of said display elements includes a transistor and a capacitive element. The method includes generating a control signal when the voltage of at least one voltage source among a plurality of voltage sources has dropped to a given voltage, and controlling, in response to the control signal, the source lines, the gate lines and the common voltage terminal to discharge the capacitive element of each of the display elements.

BRIEF DESCRIPTION OF THE DRAWINGS

The above and other aspects and features of the present invention will become readily apparent from the detailed description that follows, with reference to the accompanying drawings, in which.

DETAILED DESCRIPTION OF PREFERRED EMBODIMENTS

The present invention will now be described by way of preferred but non-limiting embodiments.

Figure 1:
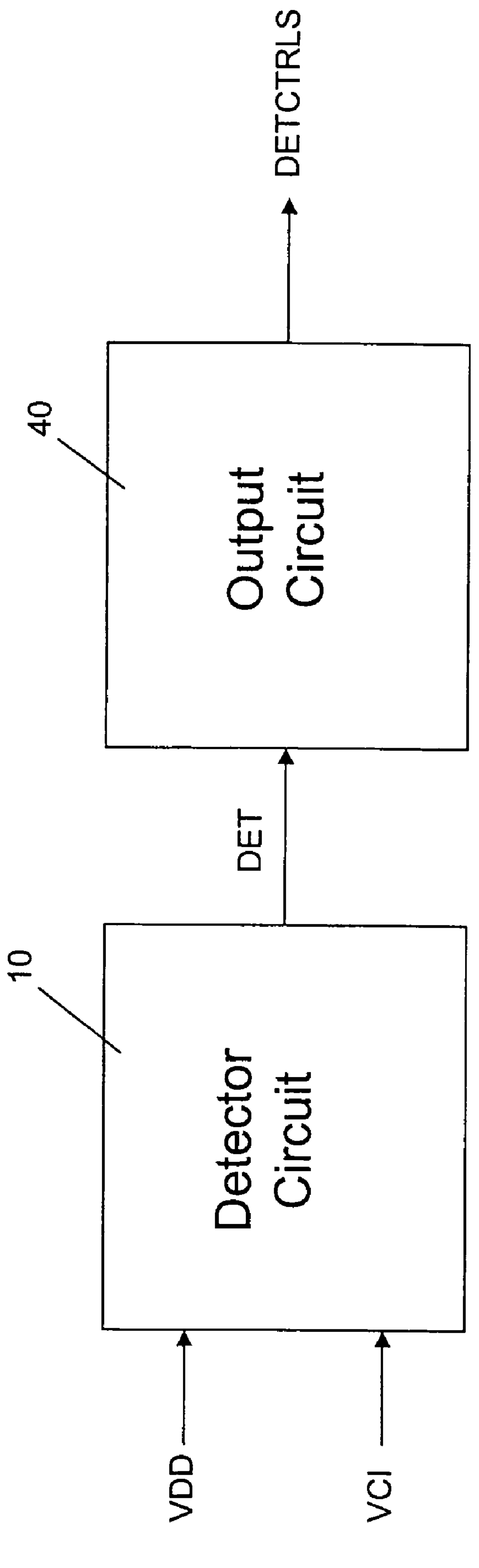
FIG. 1 is a block diagram of a circuit for generating a control signal which may be used for removal of an afterimage from an active matrix display device according to an embodiment of the present invention.

FIG. 1 is a block diagram of a circuit for generating a control signal which may be used for removal of an afterimage from an active matrix display device according to an embodiment of the present invention.

As illustrated, the circuit of the embodiment includes a detector circuit 10 and an output circuit 40. The detector circuit 10 is configured to output a detection signal when a voltage of any one of multiple voltage sources drops to a given voltage level. The battery circuitry of a display device typically generates two or more types of source voltages. In this example, these voltage sources are a first source voltage VDD and a second source voltage VCI, where the second source voltage VCI is normally greater than the first source voltage VDD. When the battery circuitry is removed (disabled or disconnected), the voltage levels of VDD and VCI drop gradually and not instantaneously. Further, the lag time in the drop of the first source voltage VDD is usually different than the lag time in the drop of the second source voltage VCI, and it may not be possible to know in advance which of the two source voltages VDD and VCI will be the first to drop to any given level. As such, the detector circuit 10 is configured to output a detection signal DET when either one of the first source voltage VDD or second source voltage VCI first drops to a given voltage level. Specific examples of the detector circuit 10 are presented in later embodiments.

The output circuit 40 receives the detection signal DET from the detector circuit 10, and outputs a control signal DETCTRLS. The display device is responsive to the control signal DETCTRLS to remove an afterimage from the active matrix display device. Specific examples of the output circuit 40 are presented in later embodiments.

Figure 2:
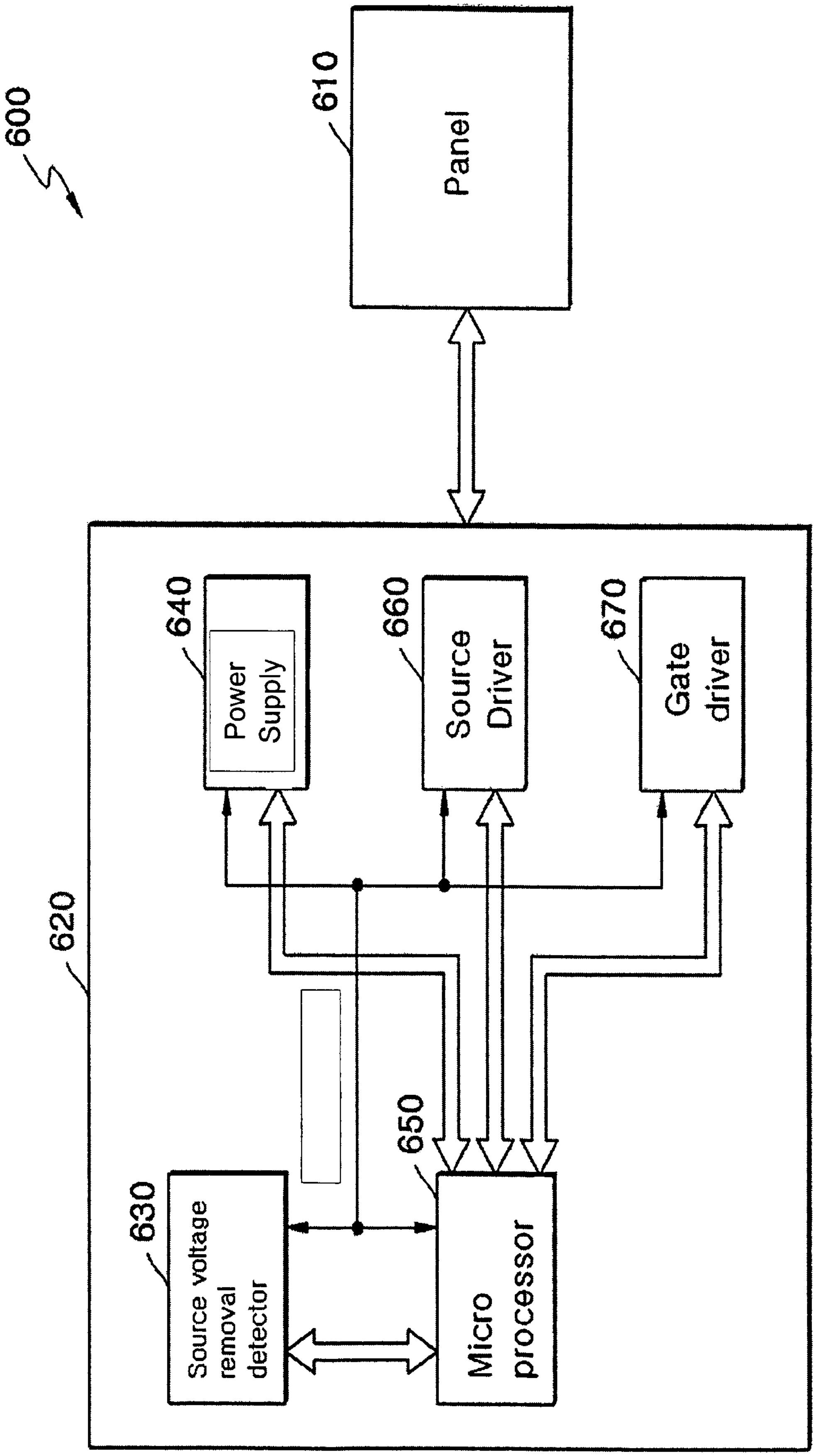
FIG. 2 is a block diagram of a display device according to an embodiment of the present invention.
Figure 3:
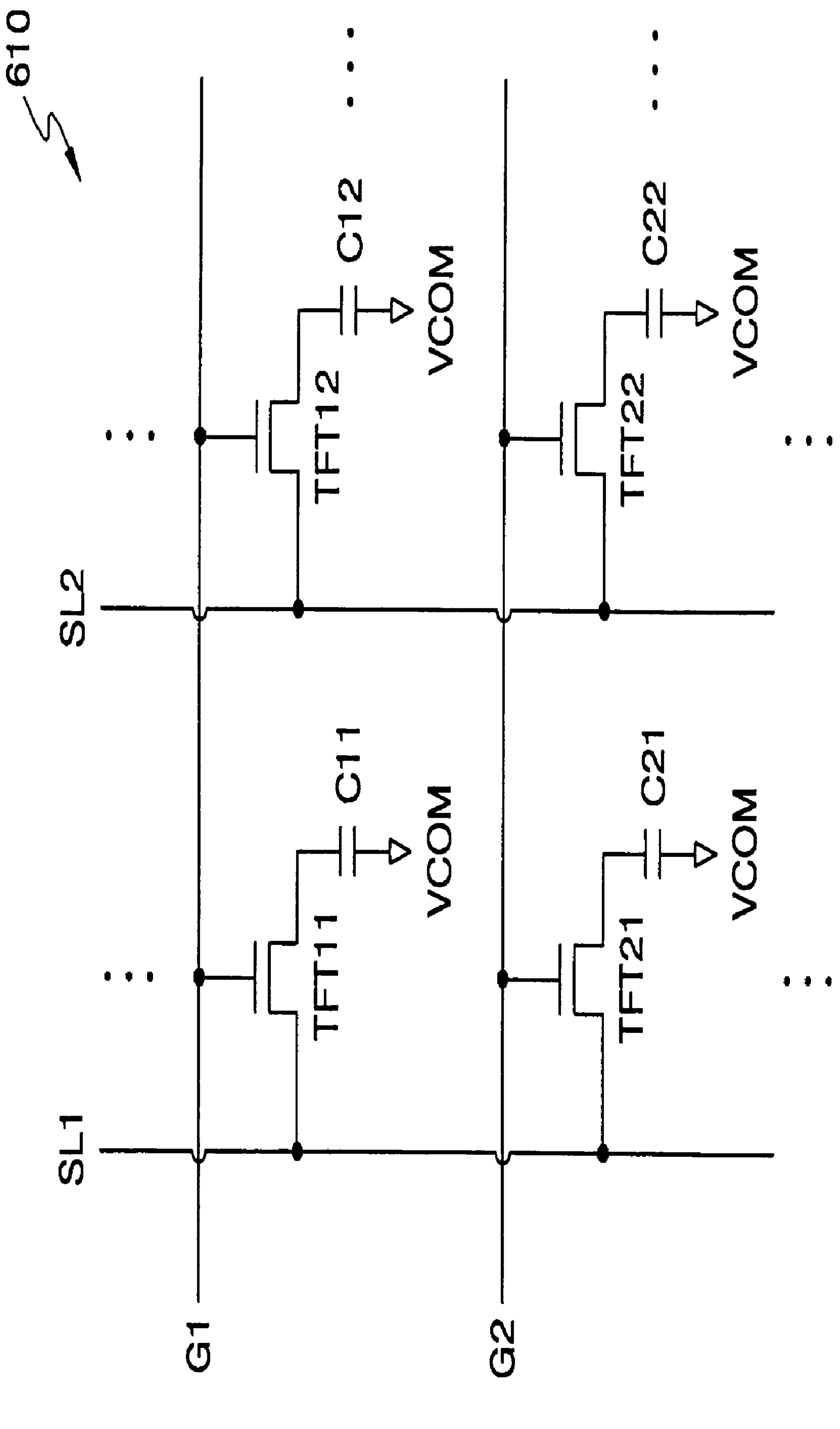
FIG. 3 is a circuit diagram of a portion of a display panel shown in FIG. 2.

FIG. 2 is a block diagram of a display device 600 which includes an active matrix display panel 610 and a display driver 620, and FIG. 3 is a circuit diagram of a portion of the active matrix display panel 610 shown in FIG. 2.

Referring first to FIG. 2, the display driver 620 generally includes source voltage removal detector 630 (such as that illustrated in FIG. 1 and in later embodiments), a microprocessor 650, a power supply 640, a source driver 660, and a gate driver 670. The microprocessor 650 controls the execution of processes of the display driver 620, while the power supply 640 generates the various power supply voltages utilized by the source driver 660, the gate driver 670, and the display panel 610.

Turning to FIG. 3, the active matrix display panel 610 is made of an array of thin film transistors TFT11, TFT12, TFT21 and TFT22. The gates of the thin film transistors are connected to gate lines G1 and G2 as shown, while the sources of the thin film transistors are connection to source lines SL1 and SL2 as shown. Capacitors C11, C12, C21 and C22 are connected between a common voltage VCOM and the drains of the thin film transistors TFT11, TFT12, TFT21 and TFT22, respectively.

Excluding the source voltage removal detector 630, the normal display operation of the display device of FIGS. 2 and 3 is well understood in the art, and accordingly, the focus of the description below primarily relates to the source voltage removal detector 630.

During the normal display operation, the thin film transistors TFT11, TFT12, TFT21 and TFT22 are selectively activated by application of activation signals (from the gate driver 670) to the gate lines G1 and G2, and image data is transferred to and stored in the capacitors C11, C12, C21 and C22 via the source lines S1 and S2 (and source driver 660). In the case where the battery power is removed or turned off, image data remains temporarily stored in the capacitors C11, C12, C21 and C22, causing the after-image effects described previously. According to aspects of the present invention, these capacitors C11, C12, C21 and C22 are rapidly discharged upon a power-off event, thus avoiding or improving upon any after-image effects of the display device.

Figure 4:
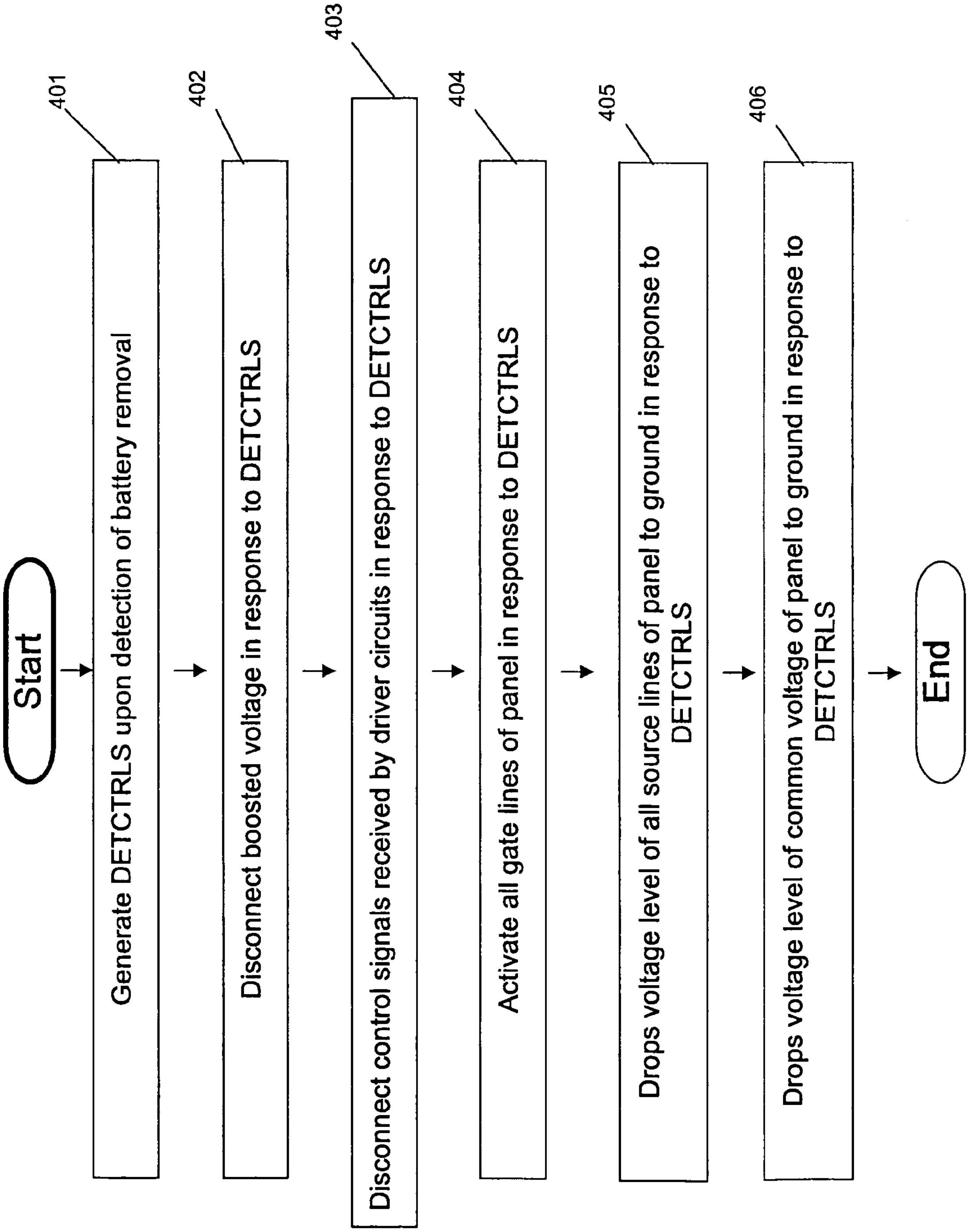
FIG. 4 is a flow chart for describing the removal of an afterimage in an active matrix display device according to an embodiment of the present invention.

Reference is additionally made to the flowchart of FIG. 4, which describes the process of removing an afterimage in an active matrix display device according to an embodiment of the present invention. At step 401, the source voltage removal detector 610 outputs a control signal DETCTRLS upon detecting that any one of at least two source voltages has dropped to a given level, thus indicating that battery power to the device has been turned off or disconnected. In response, at steps 402 and 403, a boosted voltage output by the power supply 640 is disconnected, and control signals received by the source and gate drivers 660 and 670 are disconnected. Also in response to the control signal DETCTRLS, at steps 404-406, respectively, the gate driver activates all gate lines G1 and G2 of the panel (to turn on the thin film transistors TFT11, TFT12, TFT21 and TFT22), the source driver 660 causes the source lines S1 and S2 to become ground, and the power supply 640 causes the common voltage VCOM to become ground.

By activation of the thin film transistors TFT11, TFT12, TFT21 and TFT22, and by grounding of the source lines S1, S2 and the common voltage VCOM, the capacitors C11, C12, C21 and C22 are rapidly discharged, and any after-images are thereby removed.

It is noted that steps 402 through 406 need not occur in the sequence presented in FIG. 4, and that two or more of these steps may occur simultaneously.

Figure 5:
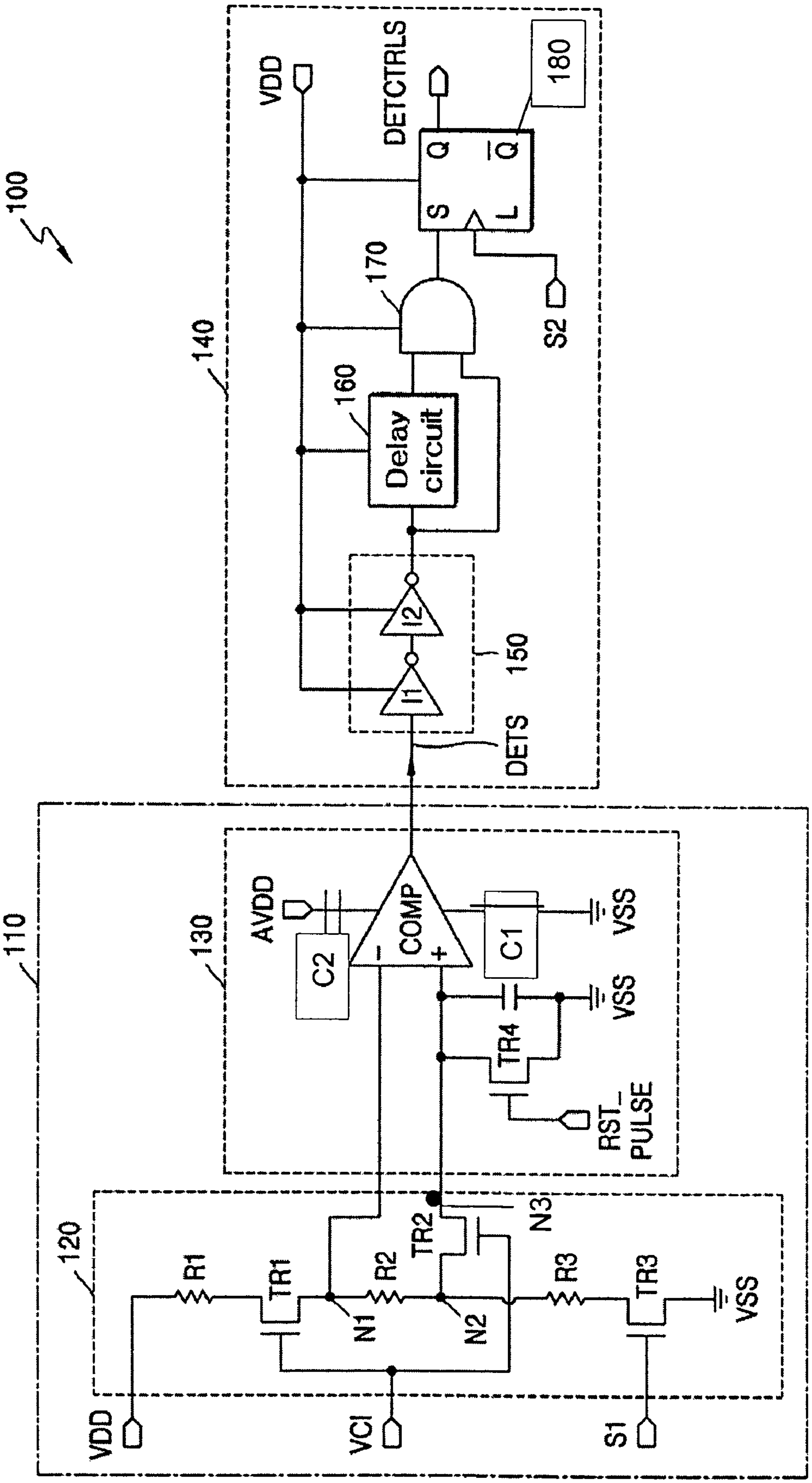
FIG. 5 is a diagram of a circuit for generating a control signal which may be used for removal of an afterimage from an active matrix display device according to another embodiment of the present invention.

FIG. 5 is a circuit diagram of a source voltage removal detection circuit 100 according to an embodiment of the present invention. The detection circuit 100 of this example generally includes a detector circuit 110 and an output circuit 140.

The detector circuit 110 of this example includes a voltage level controller circuit 120 and a compare circuit 130. In this embodiment, the voltage level controller circuit 120 includes a resistor R1 connected between a first power source terminal VDD and a source/drain terminal of a first transistor TR1, a second resistor R2 connected between nodes N1 and N2, where node N1 is connected to the other source/drain terminal of transistor TR1, and a third resistor R3 connected between node N2 and a source/drain terminal of a third transistor TR3. The voltage level controller circuit 120 also includes a second transistor TR2 having a source/drain terminal connected to node N2 and another source/drain terminal connected to node N3. The gates of the first and second transistors TR1 and TR2 are connected to a second power source terminal VCI, and the gate of the third transistor TR3 is connected to an activation signal terminal S1.

The compare circuit 130 of this embodiment includes comparator COMP having a first compare input (−) connected to node N1 and a second compare input (+) connected to node N3. The comparator COMP therefore functions to compare the voltages present at nodes N1 and N3. Further, a fourth transistor TR4 and a first capacitor C1 are connected in parallel between the compare input (+) of the comparator COMP and a ground voltage VSS. The gate of the fourth transistor TR4 is connected to a reset pulse terminal RST_PULSE. Also, as shown, the comparator COMP is connected between the ground voltage VSS and a boost voltage AVDD via a second capacitor C2. It should be noted, however, that each of the voltages VSS of FIG. 5, including the voltage VSS connected to the comparator COMP, may be set at a level other than ground (e.g., VSS may equal −0.5v).

The output circuit 140 of this embodiment includes a down level shift circuit 150 having series connected first and second invertors I1 and I2. The input of the first inverter I1 is connected to the output DETS of the comparator COMP. The output of the second inverter I2 is commonly connected to the input of a delay circuit 160 and to one input of an AND circuit 170, and the output of the delay circuit 160 is connected to the other input of the AND circuit 170. The output of the AND circuit 170 is connected to the S-input of a latch circuit 180, and the Q-output of the latch circuit 180 is connected to a detection control signal terminal DETCTRLS. Finally, a control terminal of the latch circuit 180 is connected to an activation signal terminal S2. As shown, the components of the output circuit 140 are all driven by the source voltage VDD.

The operation of the embodiment illustrated in FIG. 5 will now be described with reference to the flow chart of FIG. 6.

Initially, in a power-ON sequence, the first and second source voltages VDD and VCI are generated, and the control signal S1 and the reset pulse RST_PULSE are both LOW. In this state, the first and second transistors TR1 and TR2 are turned ON, while the third transistor TR3 remains OFF.

Still in the power-ON sequence, the boost voltage AVDD is generated, thus activating the comparator. The boost voltage AVDD is the drive voltage for the display device and is typically greater than both the first power voltage VDD and the second power voltage VCI. Then, the reset pulse RST-_PULSE is temporarily made HIGH to discharge the capacitor C1, and the control signal S1 is made HIGH to turn ON the transistor TR3. Once the reset pulse RST_PULSE is made LOW again, the detector circuit 110 is now in its detection state of operation. At this time, the capacitor becomes charged, the voltage of node N2 is roughly equal to that of node N3, and the voltage of node N1 is higher than those of nodes N2 and N3.

Since the voltage at node N1 is greater than the voltage at node N3, the output DETS of the comparator COMP is LOW.

The LOW output of the comparator COMP is passed through the voltage level shift circuit 150 and applied to the input of the delay circuit 160 and to one input of the AND circuit 170. As a result, a LOW level signal is applied to the S-input of the latch circuit 180, and the Q-output DETCTRLS remains disabled.

Figure 6:
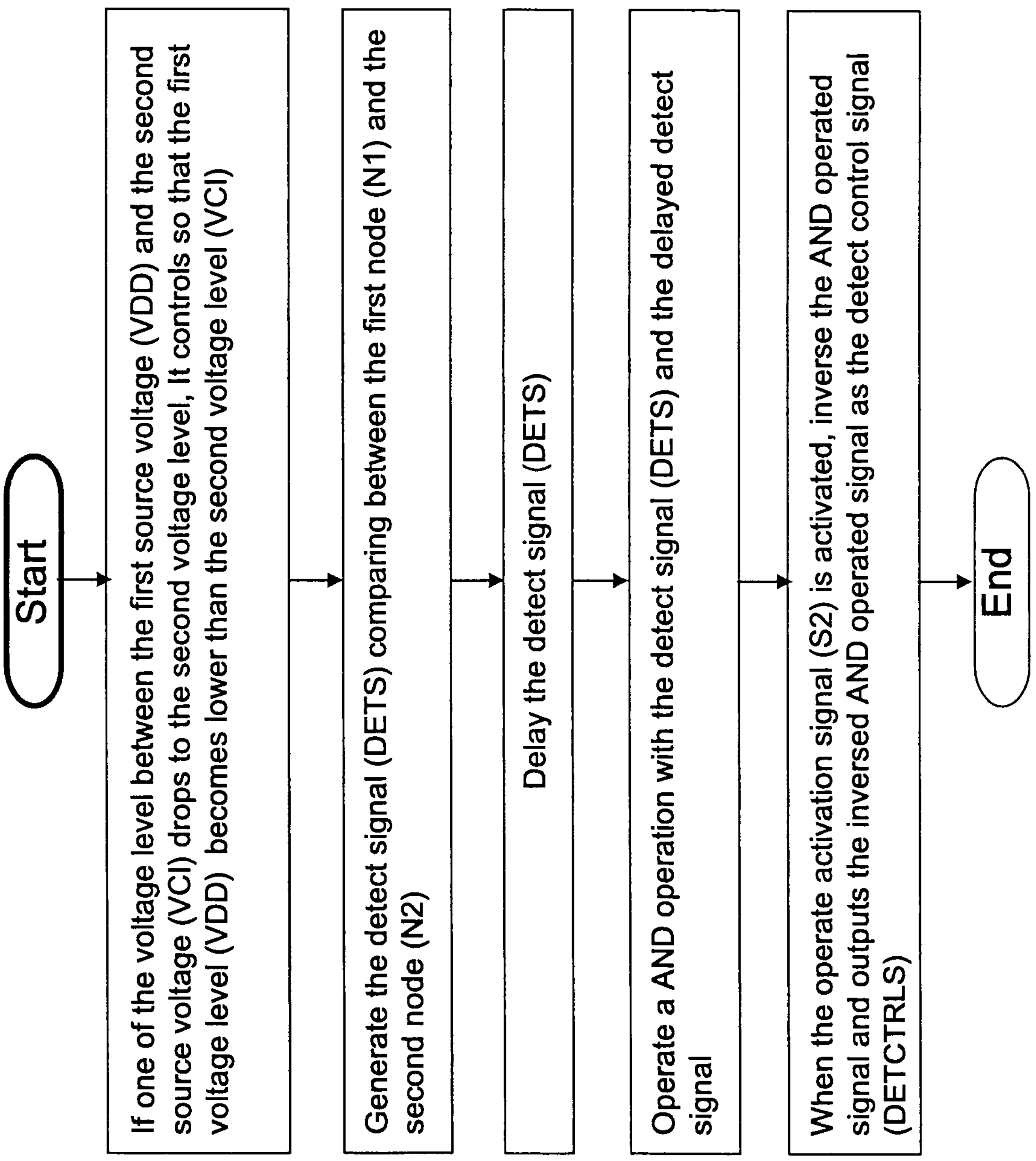
FIG. 6 is a flow chart for describing the operation of the circuit of FIG. 5.

Referring now step 601 of FIG. 6, assume now that either of first power source voltage VDD or the second power source voltage VCI drops to a given voltage. In either case, the voltage as node N1 will drop below the voltage stored across capacitor C1, i.e., the voltage at node N3.

As a result, at step 602, the output of the comparator COMP goes HIGH, which in this embodiment means that the detection signal DET has been generated. It is noted here that the second capacitor C2 is optionally provided to ensure continued operation of the comparator COMP for a sufficient time after the boost voltage AVDD is removed.

Then, at step 603, the detection signal DET is delayed by the delay circuit 160 after passing through the down level shift circuit 150.

At step 604, the non-delayed detection signal DET (i.e., from the down level shift circuit 150) and the delayed detection signal DET (i.e., from the delay circuit 160) are subjected to a logic AND operation by the AND circuit 170. The delay circuit 160 and the AND circuit 170 function together to minimize errors resulting from any transient variations in the output of the comparator COMP.

Finally, at step 605, when the activation signal S2 is activated, the latch circuit 180 inverts (to LOW) and outputs the signal from the AND circuit 170 as the control signal DET-CRLS. Generally, the activation signal S2 is held active when an image is currently being displayed on the active matrix panel display device. When no image is being displayed, the signal S2 is held inactive, since it is not necessary in this case to remove any after-image when the battery is removed.

It is noted that any exemplary logic HIGH and LOW levels discussed above and be readily modified and/or reversed.

Figure 7:
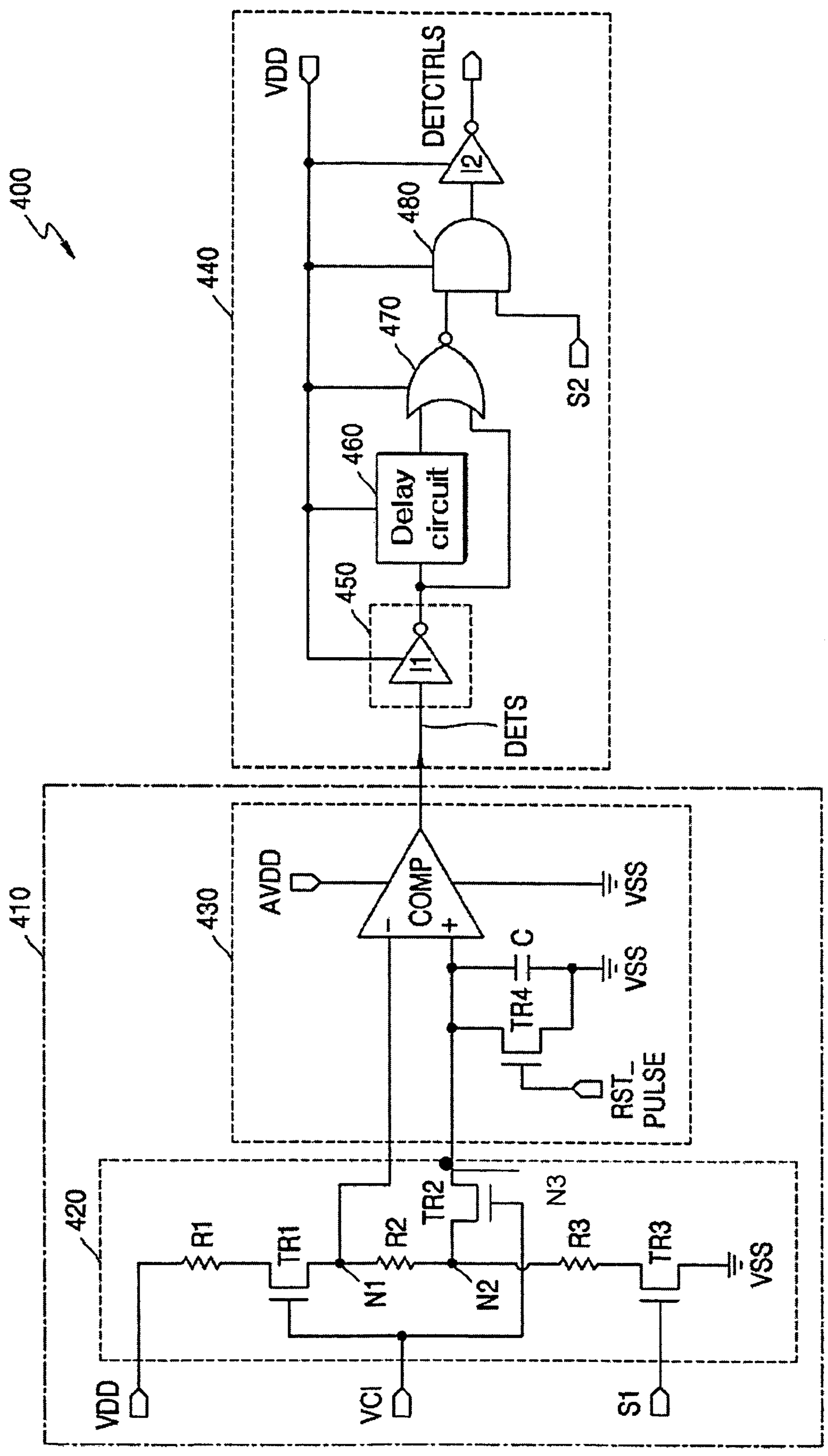
FIG. 7 is a circuit diagram of a circuit for generating a control signal which may be used for removal of an afterimage from an active matrix display device according to another embodiment of the present invention.

FIG. 7 is a circuit diagram of a source voltage removal detection circuit 400 according to another embodiment of the present invention. The detection circuit 400 of this example generally includes a detector circuit 410 and an output circuit 440.

The detector circuit 410 of this example is configured in the same manner as the detector circuit 110 of FIG. 5. That is, the detector circuit 410 includes a voltage level controller circuit 420 and a compare circuit 430.

The voltage level controller circuit 420 includes a resistor R1 connected between a first power source terminal VDD and a source/drain terminal of a first transistor TR1, a second resistor R2 connected between nodes N1 and N2, where node N1 is connected to the other source/drain terminal of transistor TR1, and a third resistor R3 connected between node N2 and a source/drain terminal of a third transistor TR3. The voltage level controller circuit 420 also includes a second transistor TR2 having a source/drain terminal connected to node N2 and another source/drain terminal connected to node N3. The gates of the first and second transistors TR1 and TR2 are connected to a second power source terminal VCI, and the gate of the third transistor TR3 is connected to an activation signal terminal S1.

The compare circuit 430 of this embodiment includes comparator COMP having a first compare input (−) connected to node N1 and a second compare input (+) connected to node N3. The comparator COMP therefore functions to compare the voltages present at nodes N1 and N3. Further, a fourth transistor TR4 and a first capacitor C1 are connected in parallel between the compare input (+) of the comparator COMP and a ground voltage VSS. The gate of the fourth transistor TR4 is connected to a reset pulse terminal RST_PULSE. Also, as shown, the comparator COMP is connected between the ground voltage VSS and a boost voltage AVDD via a second capacitor C2.

The output circuit 440 of this embodiment includes a down level shift inverting circuit 450 having an inverter I1. The input of the inverter I1 is connected to the output DETS of the comparator COMP. The output of the inverter I1 is commonly connected to the input of a delay circuit 460 and to one input of a NOR circuit 470, and the output of the delay circuit 460 is connected to the other input of the NOR circuit 470. The output of the NOR circuit 470 is applied to one input of an AND circuit 480, and an activation signal S2 is applied to the other input of the AND circuit 480. The output of the AND circuit 480 is inverted by an inverter I2 and output as the control signal DETCTRLS. As shown, the components of the output circuit 440 are all driven by the source voltage VDD.

The operation of the detector circuit 410 is the same as the operation of the detector circuit 110 of FIG. 5. Accordingly, reference is made to that previous description as to the manner in which the detector 410 operates.

Likewise, the output circuit 440 of FIG. 7 is essentially a logically variation of the output circuit 140 of FIG. 5. The detection signal DETS is down voltage shifted and inverted by the inverter I1, and then applied to the delay circuit 460 and NOR circuit 470, which together function to prevent errors resulting from the transient variations in the output of the comparator COMP. When the activation signal S2 is HIGH, a HIGH level output of the NOR circuit 470 is transferred to the inverter I2 and output as the control signal DETCTRLS.

Figure 8:
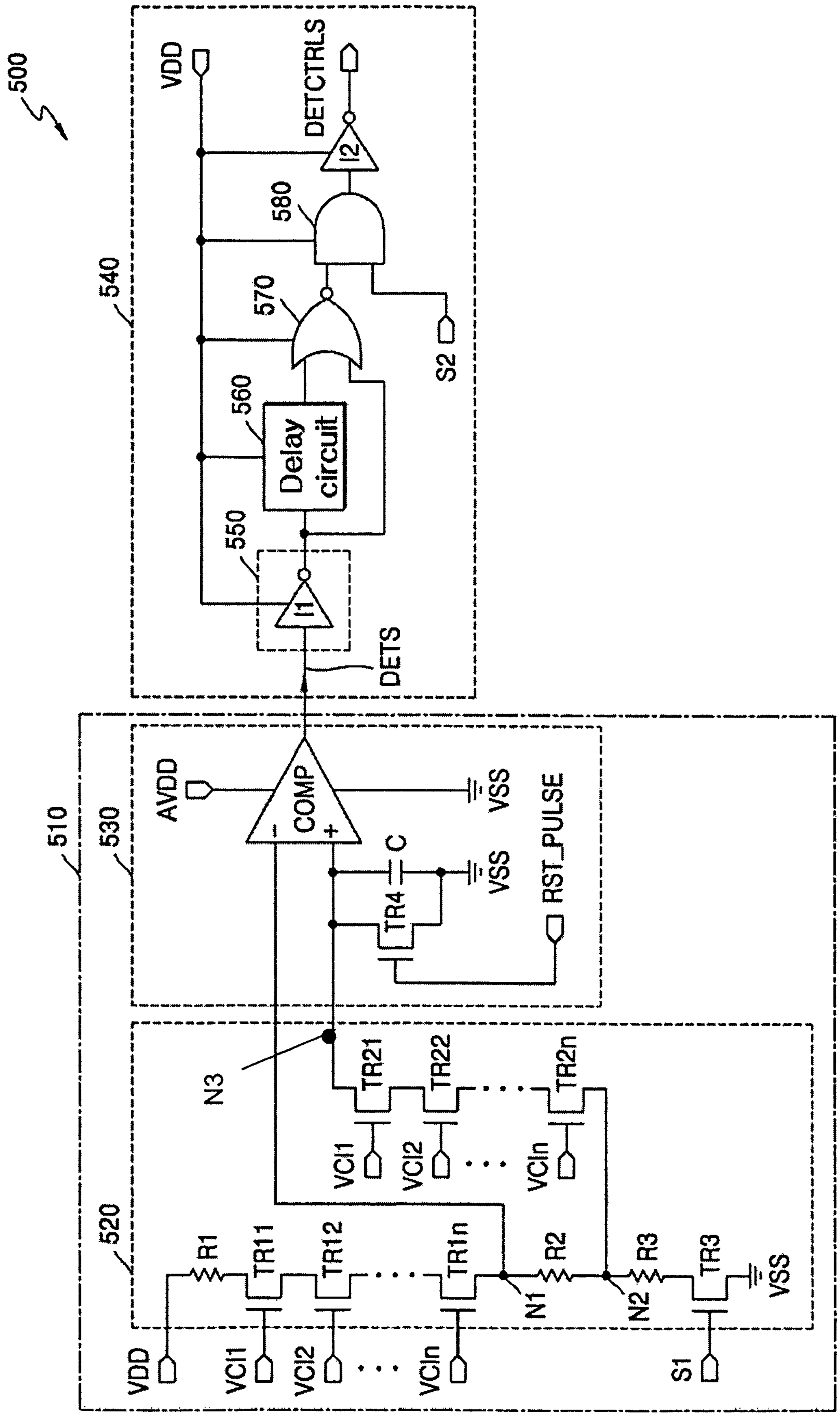
FIG. 8 is a circuit diagram of a circuit for generating a control signal which may be used for removal of an afterimage from an active matrix display device according to another embodiment of the present invention.

FIG. 8 is a circuit diagram of a source voltage removal detection circuit 500 according to another embodiment of the present invention. The detection circuit 500 of this example generally includes a detector circuit 510 and an output circuit 540.

The detector circuit 510 of this example is configured similarly to the detector circuit 110 of FIG. 5, except that the circuit 510 is configured to detect a drop in the voltage of a plurality (n) of different second source voltages VCI1, VCI2 . . . VCIn.

As shown, the detector 510 includes a voltage level controller circuit 520 and a compare circuit 530.

The voltage level controller circuit 520 includes a resistor R1 connected between a first power source terminal VDD and a source/drain terminal of a transistor TR11 among first series connected transistors TR11, TR12 . . . TR1*n*. A second resistor R2 is connected between nodes N1 and N2, where node N1 is connected to a source/drain terminal of transistor TR1*n* among the series connected transistors TR11, TR12 . . . TR1*n*.

A third resistor R3 is connected between node N2 and a source/drain terminal of a transistor TR3. The voltage level controller circuit 420 also includes second series connected transistors TR21, TR22 . . . TR2*n*. A source/drain terminal of transistor TR2*n* is connected to node N2, and a source/drain terminal of transistor TR21 is connected to node N3. As shown, the respective gates of the first series connected transistors and second series connected transistors TR1 and TR2 are connected to the second power source terminals VCI1, VCI2 . . . VCIn. Finally, the gate of the transistor TR3 is connected to an activation signal terminal S1.

The compare circuit 530 of this embodiment includes comparator COMP having a first compare input (−) connected to node N1 and a second compare input (+) connected to node N3. The comparator COMP therefore functions to compare the voltages present at nodes N1 and N3. Further, a transistor TR4 and a first capacitor C1 are connected in parallel between the compare input (+) of the comparator COMP and a ground voltage VSS. The gate of the transistor TR4 is connected to a reset pulse terminal RST_PULSE. Also, as shown, the comparator COMP is connected between the ground voltage VSS and a boost voltage AVDD via a second capacitor C2.

The output circuit 540 of this embodiment includes a down level shift inverting circuit 550 having an inverter I1. The input of the inverter I1 is connected to the output DETS of the comparator COMP. The output of the inverter I1 is connected to the input of a delay circuit 560 and to one input of a NOR circuit 570, and the output of the delay circuit 560 is connected to the other input of the NOR circuit 570. The output of the NOR circuit 570 is applied to one input of an AND circuit 580, and an activation signal S2 is applied to the other input of the AND circuit 580. The output of the AND circuit 580 is inverted by an inverter I2 and output as the control signal DETCTRLS. As shown, the components of the output circuit 540 are all driven by the source voltage VDD.

The operation of the detector circuit 510 of FIG. 8 is the essentially the operation of the detector circuit 110 of FIG. 5, and accordingly, reference is made to that previous description as to the manner in which the detector 510 operates. However, it is noted that the voltage at node N2 (or N3) will be made higher than that of node N1 if any one or more of the source voltages VC11, VC12 . . . VC1*n* drops to a given level. In this manner, the detection signal DETS is output if any one or more of the source voltage VDD and the source voltages VC11, VC12 . . . VC1*n* drop to the given level.

Likewise, the output circuit 540 of FIG. 8 is the same as the output circuit 440 of FIG. 7, and accordingly, reference is made to that earlier description with respect to the operation of the output circuit 540.

Although the present invention has been described above in connection with the preferred embodiments thereof, the present invention is not so limited. Rather, various changes to and modifications of the preferred embodiments will become readily apparent to those of ordinary skill in the art. Accordingly, the present invention is not limited to the preferred embodiments described above. Rather, the true spirit and scope of the invention is defined by the accompanying claims.

In this regard, the phrases "connected to", "connected between", and the like, are not to be interpreted as requiring direct connection between elements. Rather, these phrases encompass the possible presence of intervening elements which do not substantially alter circuit operation.

What is claimed is:

1. A circuit for generating a control signal for removal of an afterimage from an active matrix display device, the circuit comprising:

a detector circuit which simultaneously determines if a first voltage from a first voltage source drops to a given voltage level and if a second voltage from a second voltage source drops to the given voltage level, and which outputs a detection signal when either one of the first and second voltages drops to the given voltage level; and an output circuit which receives the detection signal and outputs the control signal for removal of the afterimage from the active matrix display device, wherein the first voltage and the second voltage drop to the given voltage level at different lag times, wherein the detector circuit comprises a voltage level controller and a comparator circuit, wherein the voltage level controller comprises a first resistor and a first transistor connected in series between the first voltage source and a first node, a second transistor connected between a second node and a third node, and a second resistor connected between the first node and the second node, wherein the comparator circuit outputs the detection signal and comprises a comparator having a first input connected to the first node and a second input connected to the third node, and wherein gates of the first and second transistors are connected to the second voltage source.

2. The circuit as claimed in claim 1, wherein the voltage level controller sets a voltage of the first node to be higher than a voltage of the third node when the first and second voltages are greater than the given voltage level, and sets the voltage of the first node to be less than the voltage of the third node when either one of the first and second voltage sources drops to the given voltage level; and the comparator circuit compares the voltages of the first and third nodes and outputs the detection signal.

3. The circuit as claimed in claim 2, wherein the comparator is driven by a third voltage source which generates a third voltage that is greater than or equal to the greater of the first and second voltages.

4. The circuit as claimed in claim 2, wherein the comparator is driven by a voltage which is different than the first and second voltages.

5. The circuit as claimed in claim 2, wherein the comparator is driven by a voltage which is equal to one of the first and second voltages.

6. The circuit as claimed in claim 2, wherein the output circuit comprises:

a voltage shift circuit which reduces a voltage of the detection signal to obtain a voltage-level-shifted detection signal;

a delay circuit which delays the voltage-level-shifted detection signal to obtain a delayed voltage-level-shifted detection signal; and a logic circuit which performs a logical operation on the voltage-level-shifted detection signal and the delayed voltage-level-shifted detection signal.

7. The circuit as claimed in claim 2, wherein a first input of the comparator is electrically connected to the first node, and a second input of the comparator is electrically connected to the second node.

8. The circuit as claimed in claim 7, further comprising a capacitor connected between the second input of the comparator and a reference voltage.

9. The circuit as claimed in claim 8, wherein the reference voltage is a ground voltage.

10. The circuit as claimed in claim 1, wherein the voltage level controller further comprises a third transistor and a third resistor connected in series between the second node and a reference voltage, and wherein a gate of the third transistor is connected to an activation signal terminal.

11. The circuit as claimed in claim 10, wherein the comparator circuit further comprises a fourth transistor and a capacitor connected in parallel between the second input of the comparator and the reference voltage, and wherein a gate of the fourth transistor is connected to a reset pulse signal terminal.

12. The circuit as claimed in claim 11, wherein the reference voltage is a ground voltage.

13. A circuit for generating a control signal for removal of an afterimage from an active matrix display device, the circuit comprising:

a detector circuit which simultaneously determines if a first voltage from a first voltage source drops to a given voltage level and if a second voltage from a second voltage source drops to the given voltage level, and which outputs a detection signal when either one of the first and second voltages drops to the given voltage level; and an output circuit which receives the detection signal and outputs the control signal for removal of the afterimage from the active matrix display device, wherein the first voltage and the second voltage drop to the given voltage level at different lag times, wherein the second voltage source includes a plurality of different second voltage sources, and wherein the detector circuit comprises a voltage level controller and a comparator circuit, wherein the voltage level controller comprises a first resistor and a first plurality of transistors connected in series between the first voltage source and a first node, a second plurality of transistors connected in series between a second node and a third node, and a second resistor connected between the first node and the second node, wherein the comparator circuit outputs the detection signal and comprises a comparator having a first input connected to the first node and a second input connected to the third node, wherein respective gates of the first plurality of transistors are connected to the plurality of different second voltage sources, and wherein respective gates of the second plurality of transistors are connected to the plurality of different second voltage sources.

14. The circuit as claimed in claim 13, wherein the voltage level controller further comprises a third transistor and a third resistor connected in series between the second node and a reference voltage, and wherein a gate of the third transistor is connected to an activation signal terminal.

15. The circuit as claimed in claim 14, wherein the comparator circuit further comprises a fourth transistor and a capacitor connected in parallel between the second input of the comparator and the reference voltage, and wherein a gate of the fourth transistor is connected to a reset pulse signal terminal.

16. The circuit as claimed in claim 15, wherein the reference voltage is a ground voltage.

17. A display device comprising an active matrix display panel and a display driver operatively coupled to the display panel, wherein the display panel comprises a matrix of display elements connected to source lines and gate lines, and wherein the display driver comprises a control circuit for generating a control signal for removal of an afterimage from the active matrix display device, said control circuit comprising:

a detector circuit which receives a first voltage from a first voltage source and a second voltage from a second voltage source, which simultaneously determines if the first voltage drops to a given voltage level and if the second voltage drops to the given voltage level, and which outputs a detection signal when either one of the first and second voltages drops to the given voltage level, as the first voltage and the second voltage drop to the given voltage level over different time periods; and an output circuit which receives the detection signal and outputs the control signal for removal of the afterimage from the active matrix display device, wherein the detector circuit comprises a voltage level controller and a comparator circuit, wherein the voltage level controller comprises a first resistor and a first transistor connected in series between the first voltage source and a first node, a second transistor connected between a second node and a third node, and a second resistor connected between the first node and the second node, wherein the comparator circuit outputs the detection signal and comprises a comparator having a first input connected to the first node and a second input connected to the third node, and wherein gates of the first and second transistors are connected to the second voltage source.

18. The display device as claimed in claim 17, wherein each of the display elements comprises:

a transistor having a source electrode connected to a source line, and a gate electrode connected to a gate line; and a capacitive element connected between a drain electrode of the transistor and a common voltage terminal.

19. The display device as claimed in claim 18, wherein the control signal causes an accelerated discharge of the capacitive element.

20. The display device as claimed in claim 19, wherein the voltage level controller sets a voltage of the first node to be higher than a voltage of the third node when the first and second voltages are greater than the given voltage level, and sets the voltage of the first node to be less than the voltage of the third node when either one of the first and second voltage sources drops to the given voltage level; and the comparator circuit compares the voltages of the first and third nodes and outputs the detection signal.

21. The circuit as claimed in claim 20, wherein the comparator is driven by a boosted voltage which is used to drive the display panel.

22. The circuit as claimed in claim 20, further comprising a capacitor connected between the second input of the comparator and a reference voltage.

23. The circuit as claimed in claim 19, wherein the output circuit comprises:

a voltage shift circuit which reduces a voltage of the detection signal to obtain a voltage-level-shifted detection signal;

a delay circuit which delays the voltage-level-shifted detection signal to obtain a delayed voltage-level-shifted detection signal; and a logic circuit which performs a logical operation on the voltage-level-shifted detection signal and the delayed voltage-level-shifted detection signal.

24. The display device as claimed in claim 18, wherein the display driver further comprises:

a source driver which controls the source lines of the display panel;

a gate driver which controls the gate lines of the display panel; and a common voltage supply which controls the common voltage terminal of the display panel.

25. The display device as claimed in claim 24, wherein the source driver, the gate driver and the common voltage supply are responsive to the control signal to discharge the capacitive element.

26. The display device as claimed in claim 24, wherein the source driver and the common voltage supply are responsive to the control signal to ground the source lines and common voltage terminal, respectively, and wherein the gate driver is responsive to the control signal to activate the transistor of each display element.

27. A display device comprising an active matrix display panel and a display driver operatively coupled to the display panel, wherein the display panel comprises a matrix of display elements connected to source lines and gate lines, and wherein the display driver comprises a control circuit for generating a control signal for removal of an afterimage from the active matrix display device, the control circuit comprising:

a detector circuit receiving a first voltage from a first voltage source and a second voltage from a second voltage source, simultaneously determining if the first voltage drops to a given voltage level and if the second voltage drops to the given voltage level, and outputting a detection signal when either one of the first and second voltages drops to the given voltage level, as the first voltage and the second voltage drop to the given voltage level over different time periods; and an output circuit receiving the detection signal and outputting the control signal for removal of the afterimage from the active matrix display device, wherein the second voltage source includes a plurality of different second voltage sources, and wherein the detector circuit comprises a voltage level controller and a comparator circuit, wherein the voltage level controller comprises a first resistor and a first plurality of transistors connected in series between the first voltage source and a first node, a second plurality of transistors connected in series between a second node and a third node, and a second resistor connected between the first node and the second node, wherein the comparator circuit outputs the detection signal and comprises a comparator having a first input connected to the first node and a second input connected to the third node, wherein respective gates of the first plurality of transistors are connected to the plurality of different second voltage sources, and wherein respective gates of the second plurality of transistors are connected to the plurality of different second voltage sources.

28. The display device as claimed in claim 27, wherein each of the display elements comprises:

a transistor having a source electrode connected to a source line, and a gate electrode connected to a gate line; and a capacitive element connected between a drain electrode of the transistor and a common voltage terminal.

29. The display device as claimed in claim 28, wherein the control signal causes an accelerated discharge of the capacitive element.

30. The display device as claimed in claim 28, wherein the display driver further comprises:

a source driver which controls the source lines of the display panel;

a gate driver which controls the gate lines of the display panel; and a common voltage supply which controls the common voltage terminal of the display panel.

31. The display device as claimed in claim 30, wherein the source driver, the gate driver and the common voltage supply are responsive to the control signal to discharge the capacitive element.

32. The display device as claimed in claim 30, wherein the source driver and the common voltage supply are responsive to the control signal to ground the source lines and common voltage terminal, respectively, and wherein the gate driver is responsive to the control signal to activate the transistor of each display element.

* * * * *